United States Patent
Yamazaki et al.

(10) Patent No.: US 8,342,972 B2
(45) Date of Patent: Jan. 1, 2013

(54) STEERING JOINT

(75) Inventors: Kenta Yamazaki, Iwata (JP); Minoru Ishijima, Iwata (JP)

(73) Assignee: NTN Corporation, Osaka (JP)

( * ) Notice: Subject to any disclaimer, the term of this patent is extended or adjusted under 35 U.S.C. 154(b) by 334 days.

(21) Appl. No.: 12/663,888

(22) PCT Filed: May 30, 2008

(86) PCT No.: PCT/JP2008/059990
§ 371 (c)(1),
(2), (4) Date: Dec. 10, 2009

(87) PCT Pub. No.: WO2009/004877
PCT Pub. Date: Jan. 8, 2009

(65) Prior Publication Data
US 2010/0167827 A1 Jul. 1, 2010

(30) Foreign Application Priority Data
Jun. 29, 2007 (JP) ................................. 2007-172455

(51) Int. Cl.
*F16D 3/224* (2011.01)
*F16D 1/072* (2006.01)

(52) U.S. Cl. .................. 464/145; 464/182; 464/906

(58) Field of Classification Search .......... 464/144–146, 464/906, 182, 141; 403/298, 280, 282; *F16D 1/072*
See application file for complete search history.

(56) References Cited

U.S. PATENT DOCUMENTS

| 7,429,216 B2* | 9/2008 | Sekine ........................ 464/145 |
| 2003/0059144 A1 | 3/2003 | Umekida et al. | |
| 2003/0060294 A1* | 3/2003 | Ouchi | |
| 2003/0083135 A1 | 5/2003 | Yamazaki et al. | |
| 2004/0058737 A1* | 3/2004 | Yoshida et al. ............... 464/145 |
| 2007/0049382 A1* | 3/2007 | Ishijima et al. ............... 464/145 |
| 2008/0248884 A1* | 10/2008 | Ishijima et al. ............... 464/141 |

(Continued)

FOREIGN PATENT DOCUMENTS

EP 1 288 021 3/2003

(Continued)

OTHER PUBLICATIONS

International Search Report issued Aug. 5, 2008 in International (PCT) Application No. PCT/JP2008/059990.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

An outer joint member (10) and an inner joint member (40) each have a shaft portion (18 and 46) having a male spline formed thereon, and shaft clamps (60) are press-fitted onto the respective shaft portions (18 and 46). Each of the shaft clamps (60) includes: a connection hole (66) that has a female spline formed therein, extends from a first axial end partway toward a second axial end, and has no quench-hardened layer; and a cylindrical portion (64) that has no female spline formed therein and extends from the second axial end partway toward the first axial end. The shaft portions (18 and 46) each have a quench-hardened layer on the outer circumference thereof. The inner diameter of the connection hole (64) at a portion having no female spline formed therein is less than the outer diameters of the shaft portions (18 and 46).

5 Claims, 4 Drawing Sheets

U.S. PATENT DOCUMENTS

2009/0317177 A1* 12/2009 Nakagawa et al.
2010/0021102 A1* 1/2010 Fukumura et al.

FOREIGN PATENT DOCUMENTS

| JP | 63-089229 | | 4/1988 |
| JP | 2003-130082 | | 5/2003 |
| JP | 2003-246204 | | 9/2003 |
| JP | 2005-147346 | | 6/2005 |
| JP | 2005193757 A | * | 7/2005 |
| JP | 2006-084008 | | 3/2006 |
| JP | 2006084008 A | * | 3/2006 |
| JP | 2006-298297 | | 11/2006 |
| WO | WO 2007145019 A1 | * | 12/2007 |

OTHER PUBLICATIONS

International Preliminary Report on Patentability and Written Opinion of the International Searching Authority mailed Feb. 4, 2010 in International (PCT) Application No. PCT/JP2008/059990.

* cited by examiner

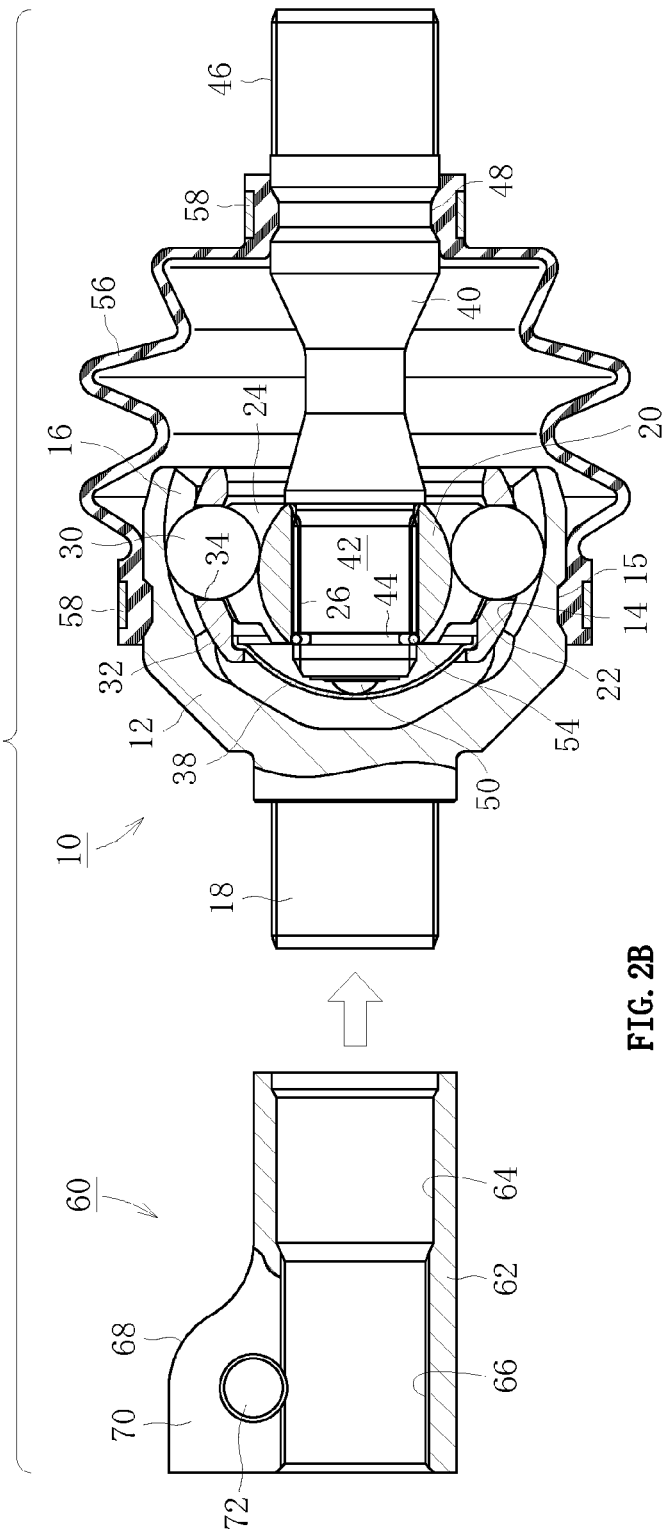
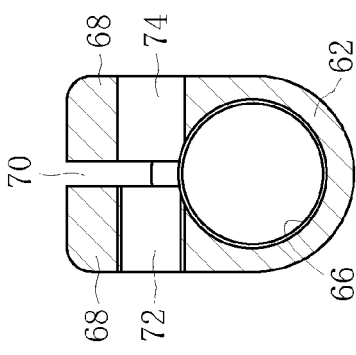
FIG. 2A
FIG. 2B

STEERING JOINT

TECHNICAL FIELD

This invention relates to a steering joint for automobiles and, more particularly, to a connection structure of the steering joint and a shaft-type connecting member.

BACKGROUND ART

General steering joints include non-constant velocity cardan joints and constant velocity double cardan joints.

Patent Document 1 describes that a fixed constant velocity joint free from backlash in the direction of rotation is used as a steering joint.

[Patent Document 1] Japanese Patent Application Laid-Open No. 2003-130082.

SUMMARY OF THE INVENTION

Problems to be Solved by the Invention

Generally, with steering joints typified by cardan joints and double cardan joints, when connecting members to be connected to the joints are of the shaft type, hole-type yokes having holes to be fitted onto the shafts of the connecting members are permanently joined to the joints by means such as welding so as to be united together. Then the yokes are fitted onto the shafts. To compensate rotational backlash caused by the fitting clearance and also to prevent the shafts from coming off, the yokes are bolted to the shafts through holes that are formed to pass through the outer circumferential portions of the yokes so as to orthogonal to splines.

With the steering joint described in Patent Document 1, securing means such as welding must be used when the connecting member is of the shaft type. When the connecting shaft member is joined to the joint by welding, no rotational backlash is allowed therebetween. However, since the welded portion is exposed to high temperature, the distortion causes cracks and a reduction in the precision of the joint, and this may result in a reduction in yield.

It is an object of this invention to provide a connection portion structure of a steering joint that can be formed without welding and does not adversely affect the precision of the joint even when a connecting member to be connected to the joint is of the shaft type.

Means for Solving the Problems

A steering joint of this invention includes: an outer joint member having a ball groove formed in an inner periphery thereof; an inner joint member having a ball groove formed in an outer periphery thereof; a torque transmission ball interposed between the ball groove of the outer joint member and the ball groove of the inner joint member; and a cage for holding the torque transmission ball. The steering joint is characterized in that the outer joint member and the inner joint member each have a male spline formed thereon for plastic joining.

Shaft clamps may be plastically joined to the respective male splines.

Each of the shaft clamps may have a connection hole that has a female spline extending from one axial end partway toward the other axial end, with the connection hole having no quench-hardened layer formed thereon. The male splines each may have an outer periphery having a quench-hardened layer formed thereon. The connection hole may have an inner diameter at a portion having no female spline formed therein, with the inner diameter being less than an outer diameter of the male spline.

In this case, the inner joint member includes an inner race and a shaft joined together in a torque transmittable manner, and this shaft corresponds to the shaft portion on which the male spline is formed. The shaft portions of the outer and inner joint members are press-fitted into the connection holes of the shaft clamps. The connection hole has no quench-hardened layer formed thereon, and the inner diameter thereof is less than the outer diameter of the shaft portion having the male spline formed thereon. Therefore, each shaft portion that has the male spline having the quench-hardened layer formed on the outer circumference thereof creates a female spline in the connection hole at the time of press-fitting, so that a spline fit therebetween is established upon completion of press-fitting. Therefore, they fit each other with no clearance therebetween, and no rotational backlash occurs. In addition, since the joint is not exposed to high temperature, the precision inside the joint is not reduced.

Grooves may be provided in respective end portions of the male splines, with the end portions being opposite to respective shaft ends. After the shaft clamps are press-fitted onto the respective receive shafts, outer circumferential end portions of the shaft clamps may be caulked at several points in areas facing the grooves. In this manner, the joint is allowed to resist a high axial load (extraction force).

A boot-securing portion may be provided in an outer circumference of the shaft clamp. In this manner, the axial dimension of the steering joint is reduced.

A sealing agent may be applied to a shaft end-side end portion of the male spline shaft. In this manner, the sealing effect between the shaft clamp and the shaft portion is improved.

Effects of the Invention

According to this invention, joining by welding is not required, and a reliable rotational backlash-elimination mechanism can be provided.

BRIEF DESCRIPTION OF THE DRAWINGS

FIG. 2A is a cross-sectional view illustrating an assembling process of the steering joint shown in FIG. 1.

FIG. 2B is a cross-sectional view of a clamp.

Figure 1:
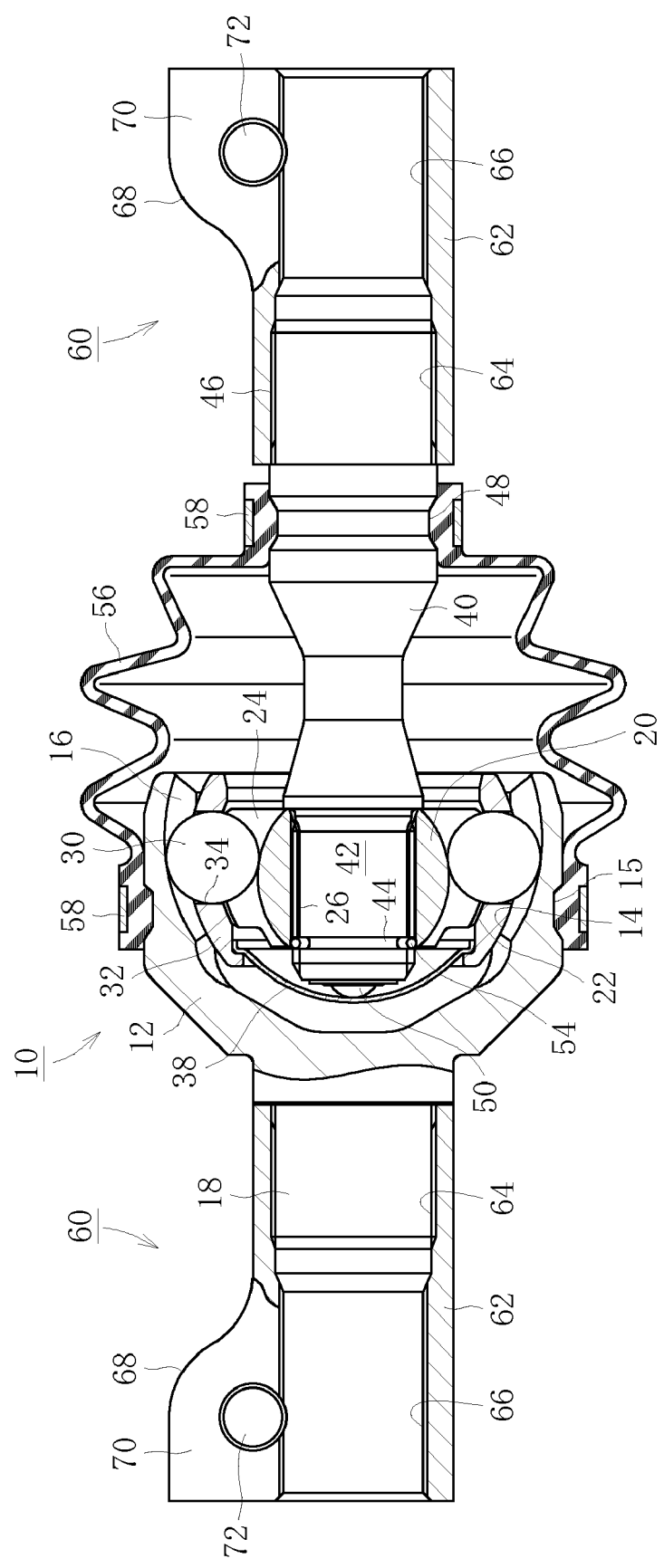
FIG. 1 is a cross-sectional view of an embodiment of a steering joint.

LIST OF REFERENCE NUMERALS 10 outer race
12 mouth portion
14 inner circumferential surface
15 recessed portion
16 ball groove
18 stem portion (shaft portion)
20 inner race
22 outer circumferential surface
24 ball groove
26 spline hole
30 ball
32 cage
34 pocket
38 receiving member
40 shaft
42 spline shaft
44 snap ring groove 46 spline shaft (shaft portion)
48 recessed portion
50 pushing member
56 boot
58 boot band
60 shaft clamp
62 socket
64 connection hole
66 spline hole
68 arm
70 slit
72 female threaded hole
74 through hole
78 groove
80 caulking portion
82 recessed portion

DETAILED DESCRIPTION OF THE INVENTION

Hereinafter, embodiments of this invention will be described by way of an example of a fixed constant velocity joint used as a steering joint. This invention is widely applicable to products that use fixed constant velocity joints such as Rzeppa joints and undercut-free joints in which straight portions are formed in parts of ball grooves.

First, a description will be given of the basic structure of the fixed constant velocity joint. As shown in FIG. 1, the main components of the fixed constant velocity joint include: an outer race 10 serving as an outer joint member; an inner race 20 serving as an inner joint member; a shaft 40; balls 30 serving as torque transmission elements; and a cage 32 that holds the balls 30.

The outer race 10 includes a mouth portion 12 and a stem portion 18. The stem portion 18 is integrated with the mouth portion 12 and is in the form of a spline (or serration, hereinafter the same applies) shaft. The spline shaft has a quench-hardened layer formed by surface hardening treatment such as high-frequency induction hardening. The mouth portion 12 is of the bell type and has a spherical inner circumferential surface 14, and axially extending curved ball grooves 16 are formed at regular circumferential intervals.

The inner race 20 has a spherical outer circumferential surface 22, and axially extending curved ball grooves 24 are formed at regular circumferential intervals. The ball grooves 16 of the outer race 10 are paired with the ball grooves 24 of the inner race 20, and one ball 30 is installed between each pair of the ball grooves 16 and 24. Generally, the number of balls 30 is plural (6 or 8). However, the number of balls is not limited to 6 or 8, and any number of balls may be used. The cage 32 is interposed between the inner circumferential surface 14 of the outer race 10 and the outer circumferential surface 22 of the inner race 20, and pockets 34 are formed at predetermined circumferential intervals. The balls 30 are received by the pockets 34 of the cage 32, and all the balls 30 are held in the same plane.

The inner race 20 has a spline hole 26 and is fitted onto a spline shaft 42 of the shaft 40 at the spline hole 26 in a torque transmittable manner. A snap ring groove 44 is formed near one end portion of the shaft 40, and a snap ring 54 is attached to the snap ring groove 44 to position the inner race 20 on the shaft 40. A spline shaft 46 is formed in the other end portion of the shaft 40. The inner race 20 and the shaft 40 are collectively called as an inner joint member.

The center of the ball grooves 16 of the outer race 10 (the outer race track center) and the center of the ball grooves 24 of the inner race 20 (the inner race track center) are axially offset from the center of the inner circumferential surface 14 of the outer race 10 and the center of the outer circumferential surface 22 of the inner race 20, respectively, by equal distances in opposite directions. The center of the outer circumferential surface of the cage 32 and the center of the inner circumferential surface 14 of the outer race 10 coincide with a joint center. The center of the inner circumferential surface of the cage 32 and the center of the outer circumferential surface 22 of the inner race 20 also coincide with the joint center. Therefore, the offset distance of the outer race track center is the distance between the outer race track center and the joint center, and the offset distance of the inner race track center is the distance between the inner race track center and the joint center. These offset distances are the same. Therefore, the ball tracks formed from the pairs of the ball grooves 16 and 24 form a wedge-like shape having a width decreasing from the opening side of the outer race 10 toward the inner side thereof.

When the axial line of the outer race 10 and the axial line of the inner race 20 form an angle, i.e., the joint is operated at an operating angle, the balls 30 guided by the cage 32 are held in a plane bisecting the operating angle, and the velocity of the joint is maintained at a constant.

The inside of the joint is filled with lubricating grease. To prevent leakage of the lubricating grease and to prevent entry of foreign objects from the outside, a boot 56 is attached to the joint. The boot 56 is mounted by attaching its attaching portion on the large-diameter side to a recessed portion 15 formed in the outer race 10 and attaching another attaching portion on the small-diameter side to a recessed portion 48 formed in the shaft 40.

A receiving member 38 attached to the cage 32 and a pushing member 50 attached to the shaft 40 form a unit for removing rotational backlash.

The pushing member 50 includes, for example, a semispherical head portion and a cylindrical barrel portion, and the barrel portion is slidably inserted into a shaft hole that is formed in the shaft 40 so as to have an opening on one shaft edge. The pushing member 50 is elastically pressed by an elastic member (not shown), typified by a compression coil spring, in a direction projecting from the shaft edge of the shaft 40. For example, the compression coil spring is interposed between the shaft edge of the shaft 40 and a projecting portion of the semispherical head portion that radially projects from the barrel portion.

The receiving member 38 is attached to the cage 32. For example, the circumference of the receiving member 38 is engaged onto a recessed portion formed in the inner circumference of the recessed end portion of the outer race 10 of the cage 32 and is secured by appropriate means such as press fitting, caulking, or welding. As shown in the drawings, the receiving member 38 as a whole has a partial spherical shape, and the inner surface of the receiving member 38, i.e., the surface facing the end portion of the shaft 40 has a concave spherical shape. The receiving member 38 functions as a receiving surface that receives the semispherical head portion of the pushing member 50.

In the above configuration, when the inner race 20 is fitted onto the shaft 40 and positioned by the snap ring 54, the pushing member 50 and the receiving member 38 abut against each other, and the elastic member is compressed. An axial elastic force is thereby exerted between the inner race 20 and the cage 32, and this causes them to relatively move in the axial direction. The relative movements cause the balls 30 to be pushed through the cage 32 in the direction of shrinking the ball tracks. Therefore, the balls 30 always abut against the ball grooves 16 and 24, whereby rotational backlash is prevented. Since rotational backlash is prevented in the manner described above, this fixed constant velocity joint can be suitably used as a steering joint for automobiles in which rotational backlash should be avoided.

Shaft clamps 60 are attached to the stem portion 18 of the outer race 10 and the spline shaft 46 of the shaft 40, respectively.

A description will be given with reference to FIGS. 2A and 2B that illustrate the state before the shaft clamps 60 are attached to the joint. Each shaft clamp 60 includes a cylindrical socket 62 and a pair of arms 68, and the socket 62 has a cylindrical connection hole 64 formed on a first axial end side and a spline hole 66 formed on a second axial end side. The pair of arms 68 are disposed in an area on the second axial end side, i.e., in the area of the spline hole 66, and project in the radial direction of the socket 62, as shown in FIG. 2B. A female threaded hole 72 is formed in one of the pair of arms 68, and a through hole 74 is formed in the other. The pair of arms 68 face each other with a slit 70 interposed therebetween, and the slit 70 reaches the spline hole 66. Therefore, when a bolt (not shown) is inserted from the through hole 74 and tightened into the female threaded hole 72, the spline hole 66 is elastically deformed in a direction of shrinking the diameter. The spline shaft of a steering shaft (not shown) is fitted into the spline hole 66 and tightened with the bolt.

The connection hole 64 has a cylindrical shape, and a quench-hardened layer is not formed thereon. The inner diameter of the cylindrical region is set to be smaller than the outer diameters of the stem portion 18 of the outer race 10 and the spline shaft 46 of the shaft 40. The stem portion 18 of the outer race 10 is formed as a shaft portion having male splines formed thereon and has a quench-hardened layer on the outer circumference. Similarly, the spline shaft 46 of the shaft 40 is formed as a shaft portion having male splines formed thereon and has a quench-hardened layer on the outer circumference. When these shaft portions 18 and 46 are press-fitted into the connection holes 64 of the shaft clamps 60, the splines are transferred by one or both of plastic flow and shearing, whereby female splines that fit the male splines are formed with no clearance therebetween.

Figure 3:
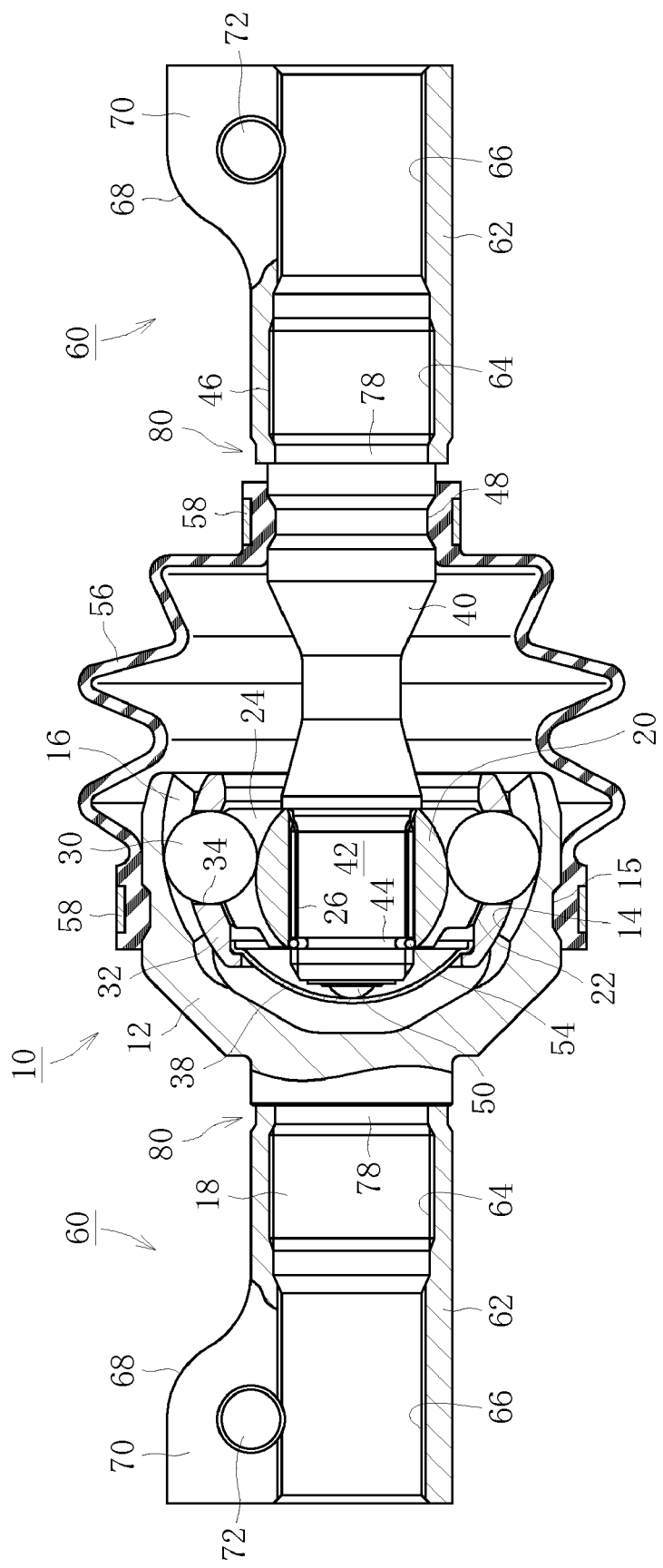
FIG. 3 is a cross-sectional view of another embodiment of the steering joint.

When an axial extraction load must be more reliably ensured through the interference and the fitting length, grooves 78 are provided in the root portions of the male splines of the stem portion 18 and of the spline shaft 46, as shown in FIG. 3. After press-fitting, the outer circumferential end portion of each socket 62 is caulked at several points in an area facing the groove 78, as shown by reference numeral 80.

Figure 4:
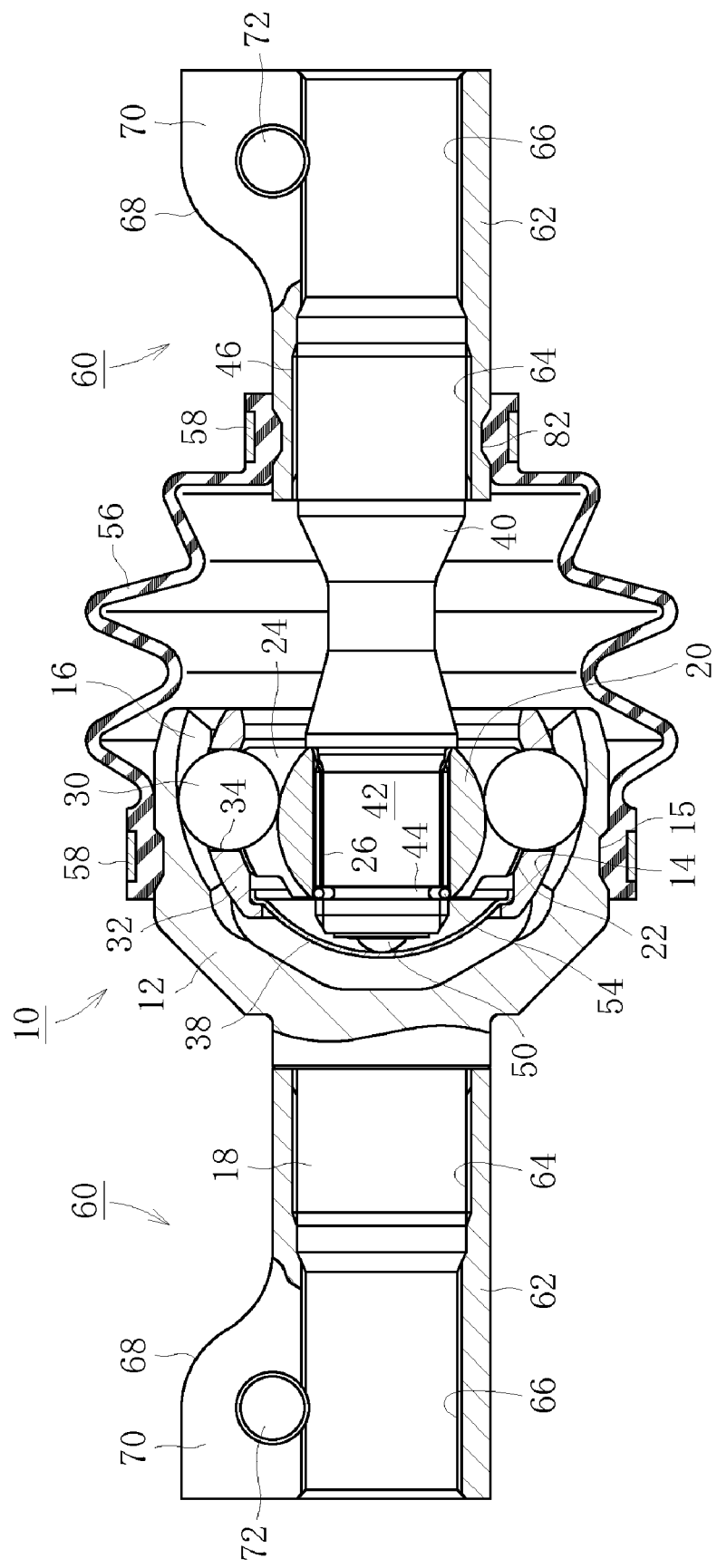
FIG. 4 is a cross-sectional view of another embodiment of the steering joint.

FIG. 4 shows another embodiment in which a recessed portion 82 for receiving the attaching portion on the small-diameter side of the boot 56 is provided in one of the shaft clamps 60. As is clear by comparing FIG. 1 with FIG. 4, with this structure, the axial length of the joint assembly can be reduced. Moreover, to improve the sealing properties between the shaft 40 and the shaft clamp 60, a sealing agent may be applied to the spline fitting portion between the spline shaft 46 of the shaft 40 and the shaft clamp 60.

The invention claimed is:

1. A steering joint comprising:
an outer joint member having a ball groove formed in an inner periphery thereof;
an inner joint member having a ball groove formed in an outer periphery thereof;
a torque transmission ball interposed between the ball groove of the outer joint member and the ball groove of the inner joint member;
a cage for holding the torque transmission ball, wherein the outer joint member and the inner joint member each have a male spline shaft for plastic joining, and wherein grooves are provided in respective end portions of the male spline shafts with the end portions being opposite to respective shaft ends; and
shaft clamps plastically joined to the male spline shafts, respectively, wherein the shaft clamps are press-fitted onto the respective spline shafts, and thereafter outer peripheries at end portions of the shaft clamps are caulked at several points in areas facing the grooves.

2. A steering joint as claimed in claim 1, wherein:
each of the shaft clamps has a connection hole that has a female spline extending from one axial end partway toward the other axial end, with the connection hole having no quench-hardened layer formed thereon;
each spline shaft has an outer periphery having a quench-hardened layer formed thereon; and
each connection hole has an inner diameter at a portion having no female spline formed therein, with the inner diameter being less than an outer diameter of a corresponding spline shaft.

3. A steering joint as claimed in claim 2, wherein a boot-securing groove is provided in an outer circumference of one of the shaft clamps.

4. A steering joint as claimed in claim 1, wherein a boot-securing groove is provided in an outer circumference of one of the shaft clamps.

5. A steering joint as claimed in claim 4, wherein a sealing agent is applied to a shaft end-side end portion of the male spline shaft having the one of the shaft clamps.

* * * * *